United States Patent [19]

Pollina

[11] 4,080,069
[45] Mar. 21, 1978

[54] VIGNETTING ASSEMBLY

[76] Inventor: Peter John Pollina, 404 Wainwright Ave., Staten Island, N.Y. 10312

[21] Appl. No.: 680,667

[22] Filed: Apr. 27, 1976

[51] Int. Cl.² .................................................. G03B 27/58
[52] U.S. Cl. .................................................. 355/74
[58] Field of Search .................. 355/75, 77, 17, 19, 355/27, 29, 40, 61, 66, 72, 74, 125, 43, 46; 354/106, 109, 110, 88, 173

[56] References Cited

U.S. PATENT DOCUMENTS

| | | | |
|---|---|---|---|
| 1,933,953 | 11/1933 | Ames | 354/109 X |
| 2,088,710 | 8/1937 | Lewis | 355/77 X |
| 2,473,174 | 6/1949 | Pifer | 354/88 |
| 2,498,278 | 2/1950 | Kaplowitz | 355/75 X |
| 2,601,051 | 6/1952 | Nielsen | 355/74 |
| 2,654,289 | 10/1953 | Flynn | 355/74 X |
| 3,073,214 | 1/1963 | Haviland | 355/75 |
| 3,677,638 | 7/1972 | Daugherty | 355/74 |

FOREIGN PATENT DOCUMENTS 467,403   6/1937   United Kingdom .................. 355/74

Primary Examiner—Donald A. Griffin
Attorney, Agent, or Firm—Shlesinger, Arkwright, Garvey & Dinsmore

[57] ABSTRACT

A vignetting device has plural sets of matching vignetting plates which are accurately aligned and successively shifted to a central opening to block out different parts of the photograph area so as to permit fast and accurate preparation of special effect and composite prints.

21 Claims, 15 Drawing Figures

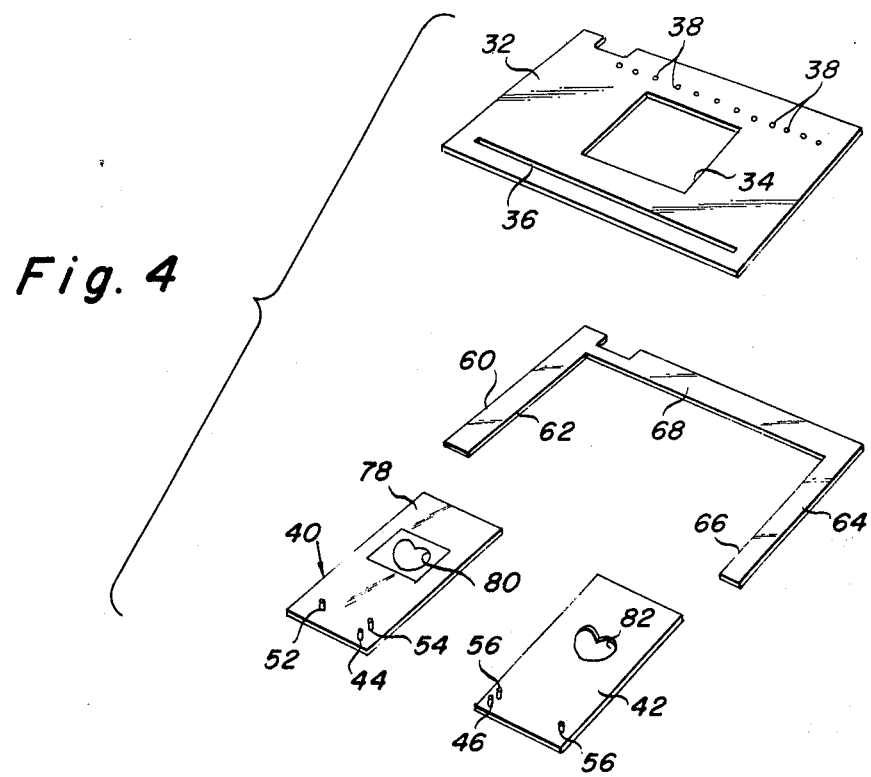
Fig. 4
Fig. 7
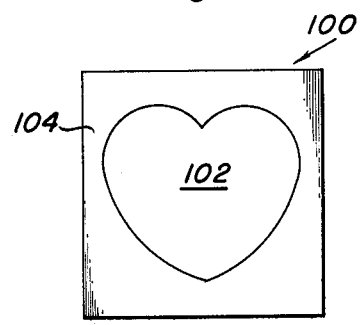
Fig. 8
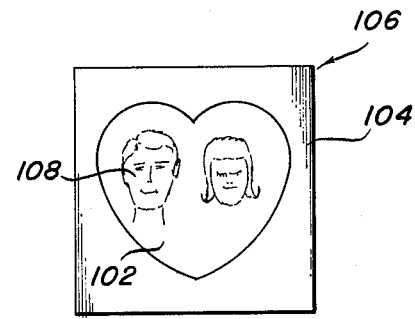
Fig. 9
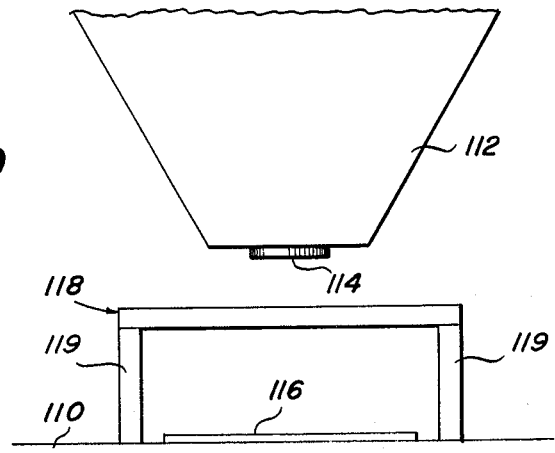

VIGNETTING ASSEMBLY

BACKGROUND OF INVENTION

The printing of photographs by professional photographers has been speeded up considerably by the use of special printing and development equipment. Such equipment has been in widespread use throughout the country in photograph studios, and in film printing laboratories. It makes possible rapid developing of ordinary photographs by operators having no particular skill in developing techniques, where only straightforward printing from a negative is required.

However, in many instances, particularly in photograph studios, many special photographic compositions and background effects are requested. In these instances, vignetting techniques, requiring skilled labor is required to produce the composite print, which cannot be handled by photographic printing machines.

Such composite prints require accurate alignment of negatives and blocking plates. In many instances, trial and error for making of individual prints, so as to assure correct alignment, blocking, and print exposure to bring about the desired finished print, is required.

As a result, the prints take time and skilled people, making such special prints very costly. The instant invention has been developed to remedy this situation.

SUMMARY OF INVENTION

This invention relates to vignetting equipment, and particularly to a device which will permit a relatively unskilled operator to develop quality special effects and composite photographic prints.

The invention permits a print to be vignetted in a very precise manner, with greater speed than heretofore possible, increasing the productivity of such prints many-fold.

Existing printing equipment can be used with no need for major modification. Further, it is possible to produce several different types of vignetting prints without any major modification of existing printing equipment.

The storage of many different sets of vignetting plates, for immediate use, with no changes in the machine, is also made possible. Each vignetting plate is very accurately positioned without any special effort by the operator. This automatic alignment of each plate speeds printing, thereby reducing cost.

The special effect makes it possible to frame a photo with a central desired outline, such as a heart, and to superimpose as a frame a border having either a different color or a different texture. The periphery between the central portion of the print and the superimposed border is not sharply defined, but has a gentle fading from border to central portion.

Composite prints are also produced where a multiple of different poses or photographs can be combined and separately spaced from each other on one large print.

DESCRIPTION OF THE DRAWINGS

FIG. 4 is a cross-sectional view of the vignetting device along lines 4—4 of FIG. 3.

FIG. 7 shows a partially completed print with a special border around a heart-shaped unexposed central portion.

FIG. 8 is a completed print showing both the border and the subjects in the heart-shaped area of the completed composite print.

FIG. 9 shows the vignetting device as used with enlarging equipment.

DESCRIPTION OF INVENTION

Figure 1:
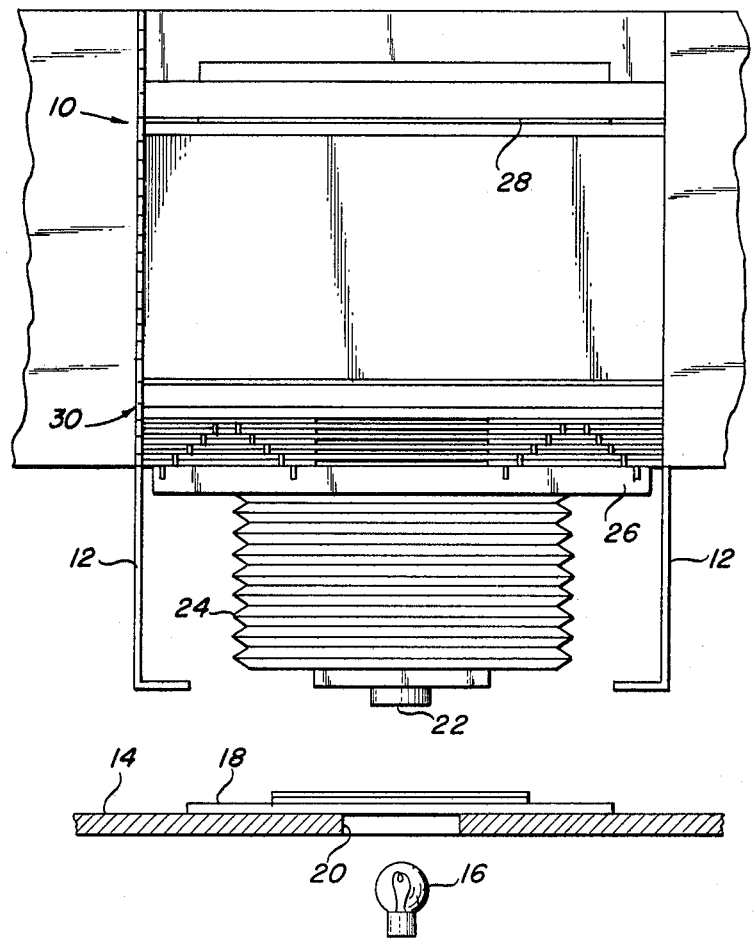
FIG. 1 is a face view disclosing a photograph printer with the vignetting device of the instant invention in position for use.

Referring particularly to FIG. 1, a printing machine generally indicated at 10 has a side panel structure 12 extended above a table 14 under which a lamp 16 is situated. A negative holder assembly 18 is disposed immediately above an opening 20 in the table 14. The lens 22 of the photoprinting machine 10 receives a light that passes through the negative holder assembly 18. The lens is suspended at the end of an expansible bellows 24 and a supporting frame 26. The printing paper 28 is disposed well above the lens 22 such that light passing through the lens will fall upon the paper itself. Paper is usually unwound from a roll and is moved as each print is made. The details of the print paper assembly are of no particular interest for this invention, and are not shown.

The vignetting assembly generally indicated at 30 is preferably placed between the lens 22 and the print paper 28, at approximately the mid-distance between the lens and the print paper.

Figure 2:
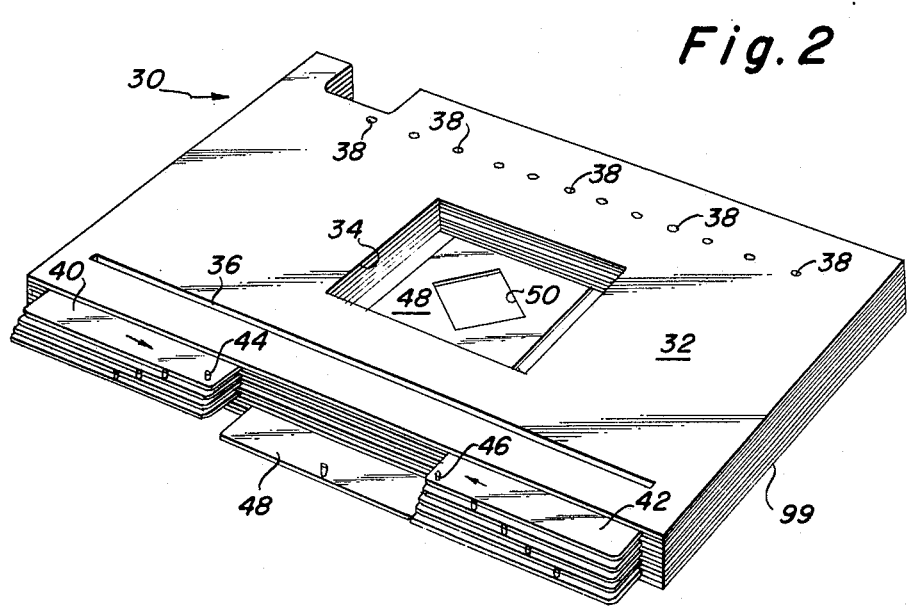
FIG. 2 is a perspective view of the vignetting device.

Referring to FIG. 2, the vignetting assembly 30 has a series of stacked and aligned aperture plates of the same shape as top plate 32. Each aperture plate has a central square aperture 34 which permits the light from the lens to pass through the plate and up to the print paper.

Each plate also has an elongated guide slot 36 extending parallel to and a short distance from the forward edge. Adjacent the rear edge of each aperture plate there is a series of linearly aligned roller bearing holes 38 parallel to the rear edge of the plate.

Sandwiched between each aperture plate there are a pair of vignetting plates, such as plates 40 and 42, each of which has a different and particular cut-out configuration which matches that of the other plate and through which light passes. The plates are moved by means of a small peg, such as pegs 44 and 46 shown on the plates 40 and 42, respectively.

A vignette plate having a given cut-out configuration can be chosen and then moved into position across the central aperture of the vignette assembly for use. For example, one of the lower plates 48, having a diamond cut-out configuration 50, is shown moved into its operable position in FIG. 2. Light passing through the assembly from the lens will provide a diamond-shaped printed area on the print paper, while the remainder of the paper outside the diamond will be kept unexposed.

Figure 3:
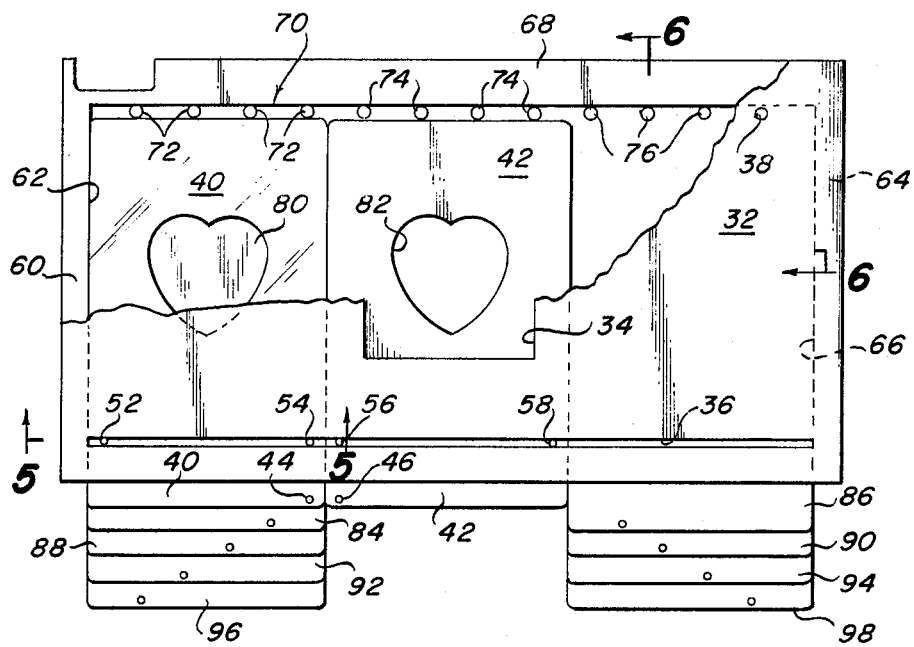
FIG. 3 is a top view of the vignetting device.

FIGS. 3 and 4 show more particularly the structural configuration of the vignette magazine assembly. Each of the five sets of vignette plates shown are similar in construction and operation. But they each have different cut-out configurations. For descriptive purposes, the upper vignette plates 40 and 42, the upper of the five pair of vignette plates shown in the vignette magazine assembly 30 of FIG. 2, will be particularly described.

Each pair of vignette plates is kept in an aligned position with its own individual aperture plate by a pair of studs such as studs 52 and 54 of plate 40, and studs 56 and 58 of plate 42. All four of these guide studs extend upwardly and ride in the elongated slot of the aperture plate, such as 36 of aperture plate 32.

Spacing between successive aperture plates for each succeeding pair of vignette plates is provided by a square U-shaped spacer plate having lateral side members 60 and 64, whose interior side edges 62 and 66, respectively, each provide a stop for a side edge of the pair of vignette plates associated with it. The interior edges are parallel to the side of the aperture opening 34, and are in the same plane. For example, the pair of vignette plates 40 and 42 each have their outside edges in contact with these side edges 62 and 66 when they are disposed in their respective stored positions to the side of the central opening 34 of the vignette plate 32. The central connecting piece 68 is narrow so that its interior edge is clear of the laterally extending row of roller bearings generally indicated at 70. The roller bearings pass through the row of openings in each aperture plate, all of which are identical, and are in vertical alignment with each other.

FIG. 3 shows the vignette magazine assembly with a portion of the top aperture plate 32 cut away to show the way in which the vignette plates are fitted in the assembly. Note that plate 40 has its left edge up against the straight edge 62 of the spacer plate side piece 60, while its back edge is in rolling engagement with the elongated and vertically disposed roller bearings 72.

In FIG. 3, it will be noted that the plate 42 has been moved into printing position across the aperture opening, and that its rear edge is in sliding contact with the four roller bearings 74. These are part of the set of twelve vertically disposed roller bearings which are in line and pass through the roller bearing holes 38. Ordinarily, when plate 42 is in its stored position to the right of the rectangular aperture 34, its rear edge would be in sliding contact with the roller bearings 76.

With respect to plates 40 and 42, it should be noted that plate 40 has a clear plastic border section 78 through which light will pass, while the heart shape 80 is a solid piece through which light will not pass. Conversely, matching plate 42 only has a heart-shaped cut-out 82 through which light can pass; the remainder of the plate is solid. The two heart-shaped configurations are identical. It should be noted that the size of the plates, as well as the frame and aperture are such that the plates can be moved to position, and the adjacent plates, as well as the spacer member side walls, act as stops which accurately hold the plate in position. The sides of each vignetting plate abut each other, and the dimensions are chosen so that the plate which is moved into the middle is stopped at exactly the right position by the side edge of the adjacent plate. The two studs at the forward edge of the plate and the linear engagement of the back edge of the plates with the cylindrical roller bearings preclude shifting of the plates.

The successive pairs of plates 84 and 86, 88 and 90, 92 and 94, and 96 and 98 are shown in FIG. 3. Each of these plates slide laterally in its given plane between the spaced stacked aperture plate members which correspond to plate 32 discussed above.

Figure 5:
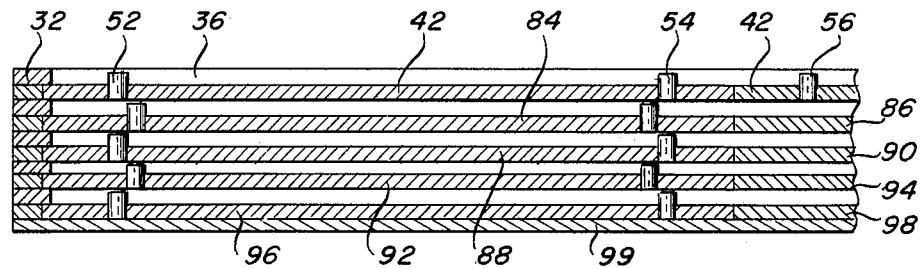
FIG. 5 is a partial section of the vignetting device taken along 5—5 of FIG. 3.

FIG. 5 is a view taken along line 5—5 of FIG. 3. The manner in which the plates are supported with respect to each other can be seen, as well as the function of the square U-shaped type plates shown in FIG. 4. The manner in which the studs act to keep the plates in alignment can readily be seen. There is some friction between the plates that would be encountered, but this is negligible, inasmuch as the plates are not pressed firmly together. An extra aperture plate 99 acts as a bottom plate.

Figure 6:
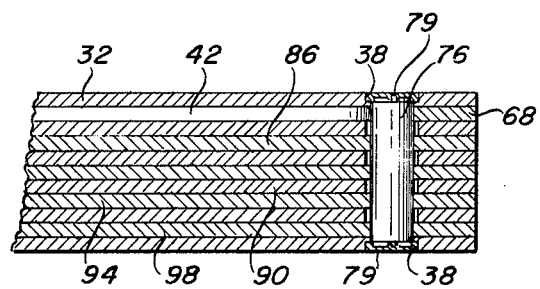
FIG. 6 is an exploded view of the vignetting device showing its major elements.

FIG. 6 is a section taken along the line 6—6. It will be noted that the rear edge of each of the plates abuts the roller 76, and that the roller is suppported in the openings 38 by the cap members 79 at the top and bottom. The rear central section 68 of the U-shaped spacer member is also shown. Note that the edge view of plate 42 is shown, rather than in section, since this plate is shifted to the operable position across the aperture 34.

The partially completed print obtained with the slide 40 is shown in FIG. 7. In this instance, the first step wherein plate 40 is moved to the central position and an exposure made, produces a print of the border section as shown in 104, and a blank unprinted section 102. Plate 40, as can be seen in FIG. 3, will permit the light to pass through the clear section 108, while the heart-shaped opaque section 80 blocks out light from the central portion of the print leaving the heart-shaped unexposed section 102.

In FIG. 8, the completed special effect print is shown. This is produced by moving plate 42 to the central area of the vignetting magazine to cover the central aperture area 34. In this second step of the process, light is permitted to pass through only the heart-shaped cut-out 82. The negative containing the photograph of the subjects is centrally located and appears in FIG. 8 at 108 within the heart.

FIG. 9 shows an enlarger assembly where the vignetting magazine is used. The table 110 is disposed below the enlarger 112 containing lens 114. The print paper 116 is disposed below and in alignment with the enlarger lens. The vignetting magazine generally indicated at 118, is supported on special legs 119 such that it is supported approximately midway between the enlarger lens 114 and the print paper 116.

Figure 10:
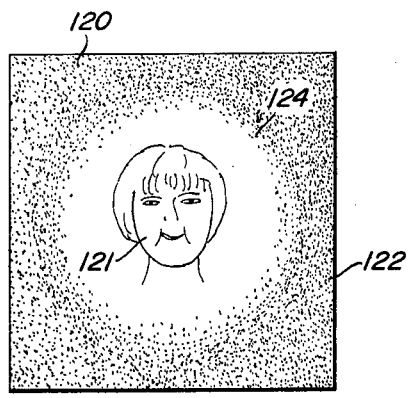
FIG. 10 shows a special effects photograph.

FIG. 10 shows a photographic print 120 illustrating the special effect created with the vignetting assembly. The central picture 121 contains the subject, and the special border 122 which can be a different color, a different texture or whatever desired, simply by making a second exposure is shown. One of the important aspects of this device is that there is an intermediate zone 124 between the central photograph and the border, in which there is a gradual transition from the border to the photograph. This is important, in that there be no sharp delineation or line between border and central photo, but rather each edge of the exposures start to fade with a lightened border. The result is created by placing of the vignetting assembly approximately midway between the lens and the print, so that each of the two exposures have a distinct small fadeout effect at its periphery.

Figure 11:
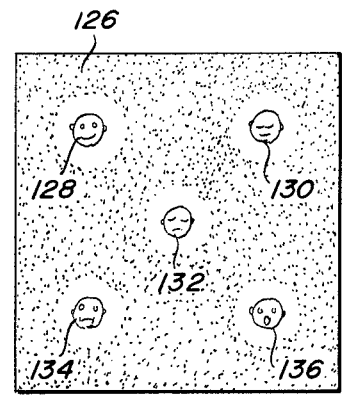
FIG. 11 is an example of a composite print.

FIG. 11 shows a composite photographic print in which five pictures, such as various poses of a baby are included. The halo or fadeout effect discussed above is noticeable about the edge of these pictures also, so that the border of each picture at the edge gradually fades into the white background. A different picture is shown at 128, 130, 132, 134, and 136. In order to accomplish this effect, each of the five different poses of the subject are successively exposed one at a time.

Figure 12:
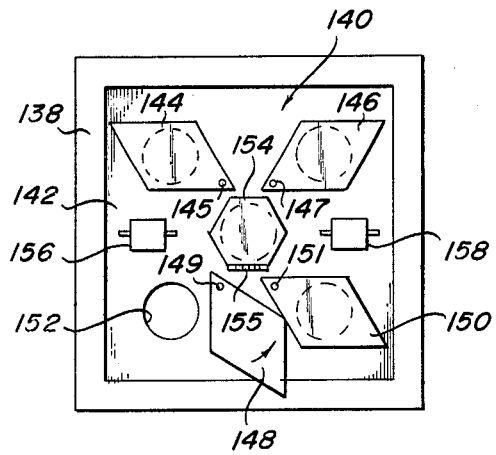
FIG. 12 is a plan view of the negative screening device used to produce a composite print.

FIG. 12 shows a framing member 138, which corresponds to the frame 18 on table 14 of FIG. 1. A special multiple negative position and holding assembly 140 is used to position and successively expose the various negatives for each of the five poses.

The assembly consists of a flat plate 142, which has five covering pieces hingedly connected to it. Covering piece 144 hinged at 145, covering piece 146 hinged at 147, covering piece 148 hinged at 149, and covering piece 150 hinged at 151 each cover one of the corner openings, such as the lower left opening 152. The other three openings are not shown, inasmuch as they are covered by their respective covering pieces. The covering pieces are each diamond shaped plates which are held in contact with flat plate 142 by their respective hinge element which can be a stud or rivet. To expose the opening beneath the cover plate, the plate is merely rotated about its rivet in contact with the surface of the flat plate 142 to expose the opening it covers. For example, cover plate 148 is shown in an uncovered position, having been moved as indicated in the direction of the arrow to uncover opening 152 of plate 142. The central opening of plate 142 is covered by the cover plate 154 which is hinged at 155 so that it can be swung upwardly and back to expose the central opening which is indicated in dotted outline.

Brackets 156 and 158 are holding and positioning brackets.

Figure 13:
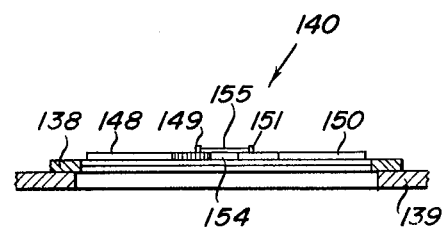
FIG. 13 is an end view of the composite masking assembly of FIG. 12.

FIG. 13 is an end view showing the manner in which the assembly 140 fits within the rectangular frame 138 and is placed on the table 139. The negatives would lie below the flat plate 142 and on the glass piece which is coplanar with 139.

Figure 14:
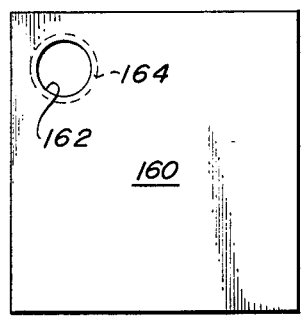
FIG. 14 shows one of the magazine plates which is used in conjunction with the composite negative masking device.

The vignetting assembly plates for composite printing, as shown in FIG. 11, have their openings particularly dimensioned to create the desired fadeout effect. The slidable plate 160 shown in FIG. 14, which is part of the vignette assembly and would be one of five such slidable plates, one for each exposure, has an opening 162 positioned and aligned with the corresponding opening in the composite negative holder assembly 140. An important factor in this instance is the relative dimensioning of the holes in plate 142 and in plate 160, for example. When the print disposed below the opening 152 in the composite assembly shown in FIG. 12 is exposed, the plate 160, which is shown from the bottom, would be slid into position in the vignetting magazine. Openings 152 and 164 are dimensioned so that the outer periphery of light coming upward from the opening 152 will extend beyond the periphery of opening 162, as shown at 164 in dotted outline. This is important to preclude a sharp delineation or cutoff of the image that would otherwise appear on the print, since the peripheral edge of opening 162 would not be able to perform its function of dispelling the light to provide a fadeout section around the periphery of the negative being printed. It has been found from experience that the bottom opening, such as opening 152 of plate 142 should preferably be about one-eighth of an inch larger than opening 162 around the entire periphery. This will produce a border width of one quarter of an inch approximately between the periphery of opening 162 and the dotted line 164 showing the image projected upwardly from opening 152.

Figure 15:
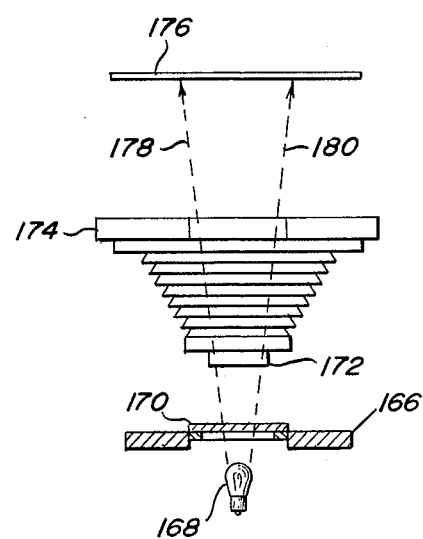
FIG. 15 is a schematic side view showing the manner in which light passes from negative to print in the production of a composite.

A schematic view of the printing and magazine assembly as it is used to make the opposite print of FIG. 11 is shown in FIG. 15. The table 166 having a bulb light source 168 projects through the negative holder 170 which passes through the lens 172 and upwardly through the opening in the vignetting assembly 174 where the light strikes the printing paper 176. Solid upwardly extending line 178 illustrates the light that would pass from the bulb 168 to the paper 176, and would be representative of the light that would pass upwardly through the opening 152 of the holder assembly of FIG. 12 and the opening 162 of plate 160 of FIG. 14. The dotted line 180 illustrates a second exposure that would then be made through one of the openings disposed on the other side of the composite negative holder assembly 140.

OPERATION

To use the invention, the magazine assembly 30 is inserted in the photoprinting machine 10, such as shown in FIG. 1, at a distance approximately midway between the lens and the print paper. The magazine is left in the machine as a permanent part of the installation. The photoprinting machine can be used in the ordinary manner with no interference from the vignetting magazine assembly 30, since the opening 34 is large enough to provide a clearance for the image to reach the photoprint paper without interference.

The disclosure shows five pairs or sets of vignetting plates in the vignetting magazine assembly 30, but either more or less plates could be used. It would also be possible to match up more than two plates by using plates in other than a single plane to provide more than two vignetting operations.

For a given vignetting operation, it is simply necessary for the operator to select the desired plate, grasp the upstanding lug, such as 46 of plate 42 of FIG. 3, and pull it so that the plate moves into position across the opening. The plate is moved until it engages the edge of the adjacent plate, which acts as a stop. This leaves the plate in the exact aligned position so that a print can be immediately made without any need for adjustment or alignment checking. The stop insures that the piece will be kept in the exact desired position.

The upstanding studs, such as 56 and 58 of plate 42, restrict the plate movement to a transverse direct movement, such that there is no binding or cocking of the plate as they slide freely along the elongated slot 36 in the aperture plate 32. Further, the rollers 74 and 76 along the back edge of the vignetting magazine keep the rear edge of the plate in alignment and provide for smooth, friction-free movement.

Preferably, the U-shaped intermediate member which is disposed adjacent the aperture plates is of slightly heavier gauge than the vignetting plates, so that although the vignetting plates rest on the aperture plate immediately below them, there is no friction between the plates and the two spaced aperture plates between which the vignette plate is disposed.

The rollers can be held in position by a cap member or by a large diameter ball bearing. The ends of the cylindrical roller bearings 76, as shown in FIG. 6, would be held by these members, which in turn are press fitted into the opening 38 of the top and bottom aperture plates. The openings 38 in the intermediate aperture plates are sufficiently large to give ample clearance for the cylindrical roller bearings 76.

In making a complete print, such as the print of FIG. 8, first one plate, such as plate 40 of FIG. 3 is moved into the central portion across the aperture opening 34 and a print made of the background border design as shown in FIG. 7.

Next plate 40 is returned to its stored position, and the second plate 42 is moved into position across the aperture openings 34. A second negative, this one, containing the images of two figures is placed in the negative holder 18 of FIG. 1, and a second exposure of the same print paper made. In this exposure, the border area will be shielded by the vignette plate 42, while the central heart-shaped area 82 of the plate allows the images to fall upon the previously unexposed heart-shaped negative area 102. The paper will then produce the second image on the heart-shaped area 102, as shown at 108 on FIG. 8, (special effects).

The remainder of the printing operation will be the same as for a conventional type single exposure print.

It can be seen that with this vignetting device, it is only necessary to select the type of vignette desired, and to move the plate into position. The printing is made immediately with no concern about whether or not there is correct alignment between negative plate and paper.

The special effects print can be made by an unskilled operator, only needing familiarity with photoprinting equipment. He can make his print in approximately a minute, as contrasted to the five to seven minutes normally required for a skilled operator attempting the same type of job.

It should also be noted that print can be made with assurance, and that the question of possible rejects due to misalignment is completely eliminated.

The machine with the vignetting magazine assembly 30 is effectively converted to perform both the simple single exposure print, as well as the more difficult composite multiple exposure print job.

Some of the same advantages are also gained with respect to the use of the vignetting magazine assembly 30 with an enlarger as shown in FIG. 9. In this instance, the vignetting magazine assembly 118 is always in correct position, and whenever a special effect or composite enlarging print is required, the appropriate vignette plates are merely moved into position as the operator would do in the photoprint machine.

As to making of a composite print, such as the print of FIG. 11, the five different negatives are each positioned under the negative holding and composite assembly device 140, each being of such size that they are framed by the opening, such as the opening size of 152 of FIG. 12. Each negative is then successively exposed, with the light passing through a corresponding plate of the magazine assembly, such as plate 160. After five exposures, the print corresponding to that shown in FIG. 11, will be obtained.

With respect to use of the assembly, it should also be noted that in many instances the negative sizes may vary, and that some adjustment should be made. It has been found that variation in size of the portion of the negative to be printed can be compensated for by changing the lenses. A special mask which is the same shape and dimensioned to correspond with the shape of the opening of the vignette magazine plates is placed over the negative to determine whether the portion of the negative desired can be readily accommodated for a given lens size. If not the lens is changed to make the necessary adjustment.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. A vignetting assembly, comprising:
   a. a light source,
   b. negative holding means disposed adjacent the light source,
   c. a lens adjacent and spaced from the negative holding means which is in direct line with the light source and the negative holding means,
   d. photoprint paper spaced from the lens and in direct line therewith such that light passing through the lens from the negative holder will fall thereon,
   e. vignetting means disposed approximately midway between the lens and the print paper and in alignment thereof for accurately blocking off from the print paper any pre-selected portion of the light passing through the lens to make a multiple exposure print, and
   f. the vignetting means contains a plurality of independent slidably movable vignetting elements each of which are positioned for and are inmmediately movable into position across an opening through the vignetting means disposed beside them and which is in alignment with the lens and the photoprint paper.

2. The vignetting assembly as set forth in claim 1, wherein:
   a. the vignetting means contains plural sets of different shaped blocking plates for blocking out different portions of the image passing through the lens.

3. The vignetting assembly as set forth in claim 1, wherein:
   a. a lens and printing paper are contained in a photoprinting machine,
   b. a vignetting means is inserted as an operable part of the photoprinting machine, and has a central opening through which light from the negative can pass, and
   c. the vignetting means has a plurality of different shaped light blocking plates.

4. The vignetting assembly as set forth in claim 3, wherein:
   a. the vignetting means has a central opening adjacent which the plates are disposed, and
   b. moving means is provided for moving any one of the light blocking plates across the opening.

5. The vignetting assembly as set forth in claim 4, wherein:
   a. the vignetting means includes at least one set of vignette plate members, each plate of the set having a different cut-out section which corresponds in size and shape to the cut-out section of the other plate.

6. The vignetting assembly as set forth in claim 4, wherein:
   a. the plates of each set of corresponding plates are so dimensioned that their side edges provide an accurate stop in stored position for the remaining plate of the set that is moved into position across the opening in the magazine.

7. The vignetting device for photoprinting apparatus as set forth in claim 4, wherein:
   a. the vignetting means contains accurate guide means for each plate so that it can be readily moved into exact position across the opening in the vignetting magazine which is rectangular.

8. The vignetting assembly as set forth in claim 7, wherein:
   a. the guide means includes a set of aligned rollers which engage an edge of the plates to make possible accurate linear movement without frictional drag.

9. The vignetting assembly as set forth in claim 7, wherein:
   a. a straight registration guide interconnects the vignette assembly frame and each plate such that the plate is held in desired position and can be readily translated across the opening.

10. The vignetting assembly as set forth in claim 1, wherein:
    a. the negative holding means has a plurality of differently positioned covered apertures, one for each negative of a composite print, which can successively be uncovered to permit each negative to be separately printed.

11. A vignetting device, comprising:
    a. a frame having an opening through which an image from a negative can be passed,
    b. the frame containing at least one pair of vignetting plates, and
    c. guide means associated with each plate and with the magazine for insuring accurate linear translation of each plate in its own plane of movement from a stored position to a position across the opening.

12. The vignetting device as set forth in claim 11, wherein:
    a. the frame has a plurality of aligned roller elements which engage the rearward edge of each vignette plate to provide for relatively friction free translational movement of the plates.

13. The vignetting device as set forth in claim 12, wherein:
    a. the frame has a straight elongated slot, and each plate of a given pair of plates has a stud which projects upwardly into the slot to provide for guiding straightline movement of each plate, and
    b. the plates are dimensioned such that the side edges of each plate provides a stop for its matching plate, such that when in contact with each other, one of the plates will be in correct lateral position for vignetting.

14. The vignetting device as set forth in claim 11, wherein:
    a. the frame has a straight elongated slot, and each plate of a given pair of plates has a stud which projects upwardly into the slot to provide for guiding straightline movement of each plate.

15. The vignetting device as set forth in claim 11, wherein:
    A. plates are dimensioned such that the side edges of each plate provide a stop for its matching plate, such that when in contact with each other, one of the plates will be in correct lateral position for vignetting.

16. A vignetting assembly, comprising:
    A. A photographic print machine having a lens and photographic printing paper aligned therewith onto which the image from the lens is projected,
    b. vignetting magazine means disposed between the lens and print paper which has a central rectangular opening and plural sets of slidable plates each of which is immediately movable from a stored position to a position such that it blocks a portion of the image projected through the lens,
    c. a negative holder assembly associated and aligned with the printing machine for blocking a portion of the image area ordinarily passed through the lens.

17. The vignetting assembly as set forth in claim 16, wherein:
    a. the vignetting means and the negative holder have matching areas through which a desired image is passed.

18. The vignetting assembly as set forth in claim 17, wherein:
    a. the area outline and size of the matching open areas are such that a slightly larger image from the negative holder open area is projected through the lens and the opening of the vignetting means at that point.

19. The vignetting assembly as set forth in claim 17, wherein:
    a. the vignetting means is disposed substantially midway between the lens and the print paper,
    b. the relative sizes of the open areas in the vignetting means and the negative holder provide a peripheral fadeout zone around the image falling on the print paper.

20. The vignetting assembly as set forth in claim 19, wherein:
    a. the negative holder assembly and the vignetting means have a plurality of matched openings.

21. The vignetting assembly as set forth in claim 20, wherein:
    a. an articulated cover plate is provided in the negative holder assembly to cover each of the openings through which a negative is exposed.

* * * * *